United States Patent
Park et al.

(10) Patent No.: US 9,728,083 B2
(45) Date of Patent: Aug. 8, 2017

(54) CONTROL APPARATUS, CONTROL TARGET APPARATUS, AND ALARM-SETTING METHOD USING THE APPARATUSES

(75) Inventors: Jangwoong Park, Seoul (KR); Seungryul Yang, Seoul (KR); Beomjin Jeon, Seoul (KR); Minsoo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 321 days.

(21) Appl. No.: 13/979,979

(22) PCT Filed: Jan. 17, 2012

(86) PCT No.: PCT/KR2012/000382
§ 371 (c)(1),
(2), (4) Date: Jul. 16, 2013

(87) PCT Pub. No.: WO2012/099370
PCT Pub. Date: Jul. 26, 2012

(65) Prior Publication Data
US 2013/0300547 A1    Nov. 14, 2013

Related U.S. Application Data

(60) Provisional application No. 61/433,273, filed on Jan. 17, 2011, provisional application No. 61/453,546, (Continued)

(51) Int. Cl.
*G08C 19/00* (2006.01)
*H04L 12/28* (2006.01)
(Continued)

(52) U.S. Cl.
CPC ............. *G08C 19/00* (2013.01); *G08C 17/02* (2013.01); *G08C 23/04* (2013.01); *H04L 12/281* (2013.01);
(Continued)

(58) Field of Classification Search
None
See application file for complete search history.

(56) References Cited

U.S. PATENT DOCUMENTS 7,506,035 B1 * 3/2009 Lu ................................. 709/219
8,150,907 B2 * 4/2012 Otsuka .................... H04L 29/06
709/203

(Continued)

FOREIGN PATENT DOCUMENTS

KR  10-2005-0078551 A    8/2005
KR  10-2006-0104736 A    10/2006
(Continued)

*Primary Examiner* — Curtis King
*Assistant Examiner* — Chico A Foxx
(74) *Attorney, Agent, or Firm* — Dentons US LLP

(57) ABSTRACT

Provided is a method of a control device to set an alarm. The method includes: discovering a first control target device including an alarm service and a second target device including a content providing service; receiving a device list registered for the alarm service from the first target device; receiving available content information from the second target device; selecting an alarm target device and a content from the device list and the content information; and transmitting an alarm setting request message to the first target device on the basis of the selected alarm target device and content.

12 Claims, 13 Drawing Sheets

Related U.S. Application Data filed on Mar. 17, 2011, provisional application No. 61/531,001, filed on Sep. 4, 2011.

(51) Int. Cl.

| | | |
|---|---|---|
| *H04L 29/08* | (2006.01) | |
| *G08C 17/02* | (2006.01) | |
| *G08C 23/04* | (2006.01) | |
| *H04L 12/24* | (2006.01) | |

(52) U.S. Cl.
CPC ...... *H04L 12/2809* (2013.01); *H04L 41/0681* (2013.01); *H04L 67/16* (2013.01); *H04L 41/0226* (2013.01); *H04L 41/0273* (2013.01); *H04L 41/22* (2013.01)

(56) References Cited

U.S. PATENT DOCUMENTS

| | | | | |
|---|---|---|---|---|
| 8,260,881 | B1 * | 9/2012 | Paleja | G06F 8/60 709/217 |
| 8,423,671 | B2 * | 4/2013 | Kim | H04L 67/16 370/254 |
| 8,606,927 | B2 * | 12/2013 | Pierce | H04L 63/083 709/227 |
| 8,699,501 | B2 * | 4/2014 | Shin et al. | 370/401 |
| 8,873,570 | B2 * | 10/2014 | P et al. | 370/401 |
| 2002/0099550 | A1 * | 7/2002 | Emerick, Jr. | 704/270 |
| 2004/0205766 | A1 * | 10/2004 | Lee | H04L 67/20 719/311 |
| 2005/0108369 | A1 * | 5/2005 | Sather et al. | 709/220 |
| 2005/0232283 | A1 * | 10/2005 | Moyer et al. | 370/401 |
| 2005/0287950 | A1 * | 12/2005 | Helden et al. | 455/41.2 |
| 2006/0153072 | A1 * | 7/2006 | Bushmitch | H04L 12/2805 370/230 |
| 2006/0198448 | A1 * | 9/2006 | Aissi | H04W 88/02 375/259 |
| 2006/0248332 | A1 * | 11/2006 | Kim et al. | 713/155 |
| 2007/0174297 | A1 * | 7/2007 | Kim | 707/10 |
| 2007/0198669 | A1 * | 8/2007 | Convertino | H04L 12/2807 709/220 |
| 2008/0239881 | A1 * | 10/2008 | Kokuryu | G04G 13/026 368/73 |
| 2009/0077203 | A1 * | 3/2009 | Janik | 709/219 |
| 2009/0092109 | A1 * | 4/2009 | Cagenius | H04L 29/12009 370/338 |
| 2009/0279673 | A1 * | 11/2009 | Maffre | H04L 12/2697 379/1.03 |
| 2010/0177598 | A1 * | 7/2010 | Zhang et al. | 368/10 |
| 2010/0185775 | A1 * | 7/2010 | Lee | H04L 12/2838 709/231 |
| 2010/0198954 | A1 * | 8/2010 | Grasso | H04L 12/2809 709/223 |
| 2013/0115872 | A1 * | 5/2013 | Huang | H04W 4/02 455/3.01 |
| 2014/0074535 | A1 * | 3/2014 | Woo-Kwan-Chung | G06Q 10/1095 705/7.19 |
| 2014/0286137 | A1 * | 9/2014 | Jeong | G04G 13/02 368/73 |

FOREIGN PATENT DOCUMENTS

| | | |
|---|---|---|
| KR | 10-2007-0011086 A | 1/2007 |
| KR | 10-0718871 B1 | 5/2007 |

* cited by examiner

FIG.11

• RegisterTelCPName( )
  Action Request

```
<?xml version= "1.0" ?>
<s:Envelop
xmlns:s= "http://schemas.xmlsoap.org/soap/envelop/"
s:encodingStyle= "http://schemas.xmlsoap.org/soap/encoding/"
<s:Body>
<u:RegisterTelCPName xmlns:u:= "urn:schemas-upnp-org:service:serviceType:v"
<TelCPName>tv@room</TelCPName>
</u:RegisterTelCPName>
</s:Body>
</s:Envelop>
```

FIG.12

• GetTelCPList( ) or GetTelCPNameList( )
  Action Request

```
<?xml version= "1.0" ?>
<s:Envelop
xmlns:s= "http://schemas.xmlsoap.org/soap/envelop/"
s:encodingStyle= "http://schemas.xmlsoap.org/soap/encoding/"
<s:Body>
<u:GetTelCPList xmlns:u:= "urn:schemas-upnp-org:service:serviceType:v"
</u:GetTelCPList>
</s:Body>
</s:Envelop>
```

FIG.13

• GetTelCPList( ) or GetTelCPNameList( )
 Action Response

```
<?xml version= "1.0" ?>
<s:Envelop
xmlns:s= "http://schemas.xmlsoap.org/soap/envelop/"
s:encodingStyle= "http://schemas.xmlsoap.org/soap/encoding/"
<s:Body>
<u:GetTelCPListResponse xmlns:u:= "urn:schemas-upnp-
org:service:serviceType:v"
<TelCPNameList>comma-separated values</TelCPNameList>
</u:GetTelCPListResponse>
</s:Body>
</s:Envelop>
```

FIG.14

• DestinationTelCP( )
 Action Request

```
<?xml version= "1.0" ?>
<s:Envelop
xmlns:s= "http://schemas.xmlsoap.org/soap/envelop/"
s:encodingStyle= "http://schemas.xmlsoap.org/soap/encoding/"
<s:Body>
<u:DestinationTelCP xmlns:u:= "urn:schemas-upnp-org:service:serviceType:v"
<ContentURI>URI of the selected content</ContentURI>
<TargetTelCPName>Desired TelCPName</TargetTelCPName>
</u:DestinationTelCP>
</s:Body>
</s:Envelop>
```

FIG.15

• AlarmInfo
 Event Notification

```
<?xml version= "1.0" ?>
<e:propertyset xmlns:e= "urn:schema-upnp-org:event-1-0" >
<e:property>
<ContentURI>URI of the selected content</ContentURI>
<TargetTelCPName>Desired TelCPName</TargetTelCPName>
</e:property>
</e:propertyset>
```

FIG.16

- UnregisterTelCPName( )
  Action Request

```
<?xml version= "1.0" ?>
<s:Envelop
xmlns:s= "http://schemas.xmlsoap.org/soap/envelop/"
s:encodingStyle= "http://schemas.xmlsoap.org/soap/encoding/"
<s:Body>
<u:UnregisterTelCPName xmlns:u:= "urn:schemas-upnp-org:service:serviceType:v"
<ContentURI>URI of the selected content</ContentURI>
<TelCPName>tv@room</TelCPName>
</u:RegisterTelCPName>
</s:Body>
</s:Envelop>
```

US 9,728,083 B2

CONTROL APPARATUS, CONTROL TARGET APPARATUS, AND ALARM-SETTING METHOD USING THE APPARATUSES

This application is a 35 USC §371 National Stage entry of International Application No. PCT/KR2012/000382 filed Jan. 17, 2012, and claims priority of U.S. provisional Application Nos. 61/433,273 filed Jan. 17, 2011; 61/453,546 filed Mar. 17, 2011 and 61/531,001 filed Sep. 4, 2011, which are hereby incorporated by reference in its entirety.

TECHNICAL FIELD

The present disclosure relates to a control device and a control target device, and more particularly, to a method of setting an alarm by using a control device and a control target device.

BACKGROUND ART

Recently, home networking connecting various home appliances and electronic devices in home as a network is developed and used and Universal Plug and Play (UPnP) technology is suggested as part of such home networking.

The UPnP network technology adapts standard networking technology such as IP and HTTP on the basis of a distributed and open network structure, so that it provides operations independent from an operating system, a platform, and a transmission medium of a device connected to a network.

The UPnP technology automatically discovers a device existing in a network on the basis of an internet standard technology such as TCP/IP, HTTP, and XML and models corresponding device's services with an action and a state variable, so that it allows a control point (CP) or another device to use such services.

A home network device specified in the UPnP technology is classified into a control device including a CP and a control target device providing service. For example, in controlling an MS device providing media service, a device including a media CP may be classified into a control device, and a media server device may be classified into a control target device.

Also, a CP may be one application. Accordingly, it is possible for several other CPs to be simultaneously mounted in a specific UPnP control device providing different services and also it is possible for CPs to be separately mounted in several devices on a network, respectively. Moreover, a control device including a control pint and a control target device may be the same.

While at least one MS containing a plurality of video and audio contents is established in such an UPnP home network, if a user accesses a MS through a CP and makes a playback request on desired AV content, content data is provided from the MS to a media renderer in a stream data format so a playback operation is performed.

However, only a control function for providing specific service in a specific target device according to a user's arbitrary input in such an UPnP home network is possible, but it is difficult to diversely utilize a function of each device on a home network at a desired point.

Especially, in the case of alarm service performing service when a specific event occurs at a specific time, it is difficult to set that a plurality of devices connected to a home network are linked to perform service when an event occurs at a specific time.

DISCLOSURE OF THE INVENTION

Technical Problem

Embodiments provide a control device and a control target device for improving linkages between home network devices and a method of operating them.

Embodiments also provide a control device and a control target device for providing service by linking a plurality of devices on a home network at a set time and a method of operating them.

Technical Solution

In one embodiment, provided is a method of a control device to set an alarm, the method including: discovering a first control target device including an alarm service and a second target device including a content providing service; receiving a device list registered for the alarm service from the first target device; receiving available content information from the second target device; selecting an alarm target device and a content from the device list and the content information; and transmitting an alarm setting request message to the first target device on the basis of the selected alarm target device and content.

In another embodiment, provided is method of a control target device to set an alarm, the method including: transmitting a device list registered for an alarm service to the control device in response to a request of the control device; setting an alarm by receiving alarm setting information including at least one of alarm time information, an alarm target device, and content information from the control device; generating an alarm event including the alarm target device and the content information at a set alarm time; and multicasting the generated alarm event to at least one device connected through a network.

In further another embodiment, provided is a control device connected to a control target device through a home network, the device including: a first control point controlling a first control device including an alarm service and receiving a device list registered for the alarm service from the first target device; a second control point controlling a second target device including a content providing service and receiving available content information from the second target device; and a controller selecting an alarm target device and a content from the device list and the content information, wherein the first control point transmits an alarm setting request message to the first target device on the selected alarm target device and content.

In still further another embodiment, provided is a control target device connected to a control device through a home network, the device including: a communication module setting a network connection with the control device and transmitting a device list registered for an alarm service to the control device in response to a request of the control device; a controller setting an alarm on the basis of alarm setting information including at least one of alarm time information, an alarm target device, and content information, which are received from the control device; and an alarm service module generating an alarm event including the alarm target device and the content information at a set alarm time, wherein the communication module multicasts the generated alarm event to at least one device connected through a network.

Advantageous Effects

According to an embodiment of the present invention, a control device may set an alarm in an alarm target device connected to a home network by using an alarm service of a control target device.

Especially, according to an embodiment of the present invention, a user may set to generate an alarm event corresponding to each control device when a plurality of control devices registered in a control target device exist.

Also, according to an embodiment of the present invention, a control device may designate content metadata of a media server when an alarm event is set. Accordingly, a user is allowed to select a content to be played at a set time in an alarm target control device.

BRIEF DESCRIPTION OF THE DRAWINGS

FIG. 11 is a view illustrating an XML schema of registration request data transmitted from a control device according to an embodiment of the present invention.

FIGS. 12 to 13 are views illustrating an XML schema of registration list request data and response data of a control device according to an embodiment of the present invention.

FIG. 14 is a view illustrating an XML schema of alarm setting request data for setting an alarm according to an embodiment of the present invention.

FIG. 15 is a view illustrating an XML schema of alarm event data occurring in a control target device according to an embodiment of the present invention.

FIG. 16 is a view illustrating an XML schema when a control device requests registration deletion to a control target device according to an embodiment of the present invention.

MODE FOR CARRYING OUT THE INVENTION

The content below illustrates the principles of the present invention. Therefore, even though this specification is clearly described or shown, those skilled in the art may realize the principle of the present invention and invent various devices within the concept and range of the present invention. Additionally, all conditional terms and embodiments listed in this specification are clearly intended as objects to understand the concept of the present invention in principle and should be understood not limited to specially list embodiments and conditions.

Terms used in this present invention select currently and extensively used general terms as far as possible in consideration of functions of the present invention, but differ according to the intents or customs of those skilled in the art or the advent of new technologies. Additionally, in certain cases, there are terms that are arbitrarily selected by the applicant, and in this case, their meaning will be listed in detail in the corresponding description part of the present invention. Accordingly, terms used in the present invention should be defined on the basis of the meanings that the terms have and the contents throughout the present invention.

The aforementioned objects, features and advantages are becoming clearer through the next detailed description relating to the accompanying drawings, and accordingly, those skilled in the art may easily realize the technical idea of the present invention. In the following description, detailed descriptions of well-known functions or constructions will be omitted since they would obscure the invention in unnecessary detail.

Hereinafter, preferred embodiments will be described in more detail with reference to the accompanying drawings.

Figure 1:
FIG. 1 is a view illustrating a configuration of a home network including a control device and a control target device according to an embodiment of the present invention.

FIG. 1 is a view illustrating a configuration of a home network according to an embodiment of the present invention.

As shown in FIG. 1, the home network according to an embodiment of the present invention includes a plurality of control devices 100 including at least one control point and a plurality f control target devices 200 providing service in response to a request of a control point.

Also, the control device 100 may include a plurality of control points to use service and the control target device 200 may include a plurality of services. However, according to a subject requesting and providing service, the control target device 200 may include a control point, and in this case, the control target device 200 may operate in the same way as the control device 100.

The plurality of control target devices 200 multicast access information to the plurality of control devices 100 to notify themselves when the plurality of control target devices 200 access to a home network. The plurality of control devices 100 accessing the home network search for or discover the control target device 200, and receive device information from the control target device 200. Also, when the control device 100 transmits a request for service in the control target device 200, the control target device 200 performs service in response to the request and transmits the response to the control device 100.

Moreover, the control target device 200 may generate an event according to service included, and when an event occurs, may multicast event information to the plurality of control devices 100. Accordingly, the plurality of control devices 100 may perform a proper operation by receiving and processing such event information.

The plurality of control devices 100 and the control target device 200 may include at least one of a control point and digital devices including service, such as a digital TV, a mobile phone, a remote control device, a personal computer, and a tablet computer, as a device connectible to a home network supporting the UPnP technology. Especially, a service provided according to an embodiment of the present invention may include an alarm service generating an event at a set specific time.

Additionally, the plurality of control devices 100 and the control target device 200 may use a standard networking technology such as IP and HTTP on the basis of the distributed and open network structure of the UPnP network.

In order to support this, a control request message and a control response message tranceived between the plurality of control devices 100 and the control target device 200 may be expressed in XML through a Simple Object Access Protocol (SOAP).

Additionally, event information multicasted due to a state change or event occurrence from the control target device 200 may be expressed in a text format through General Event Notification Architecture (GENA) and then, may be transmitted to the control device 100.

Figure 2:
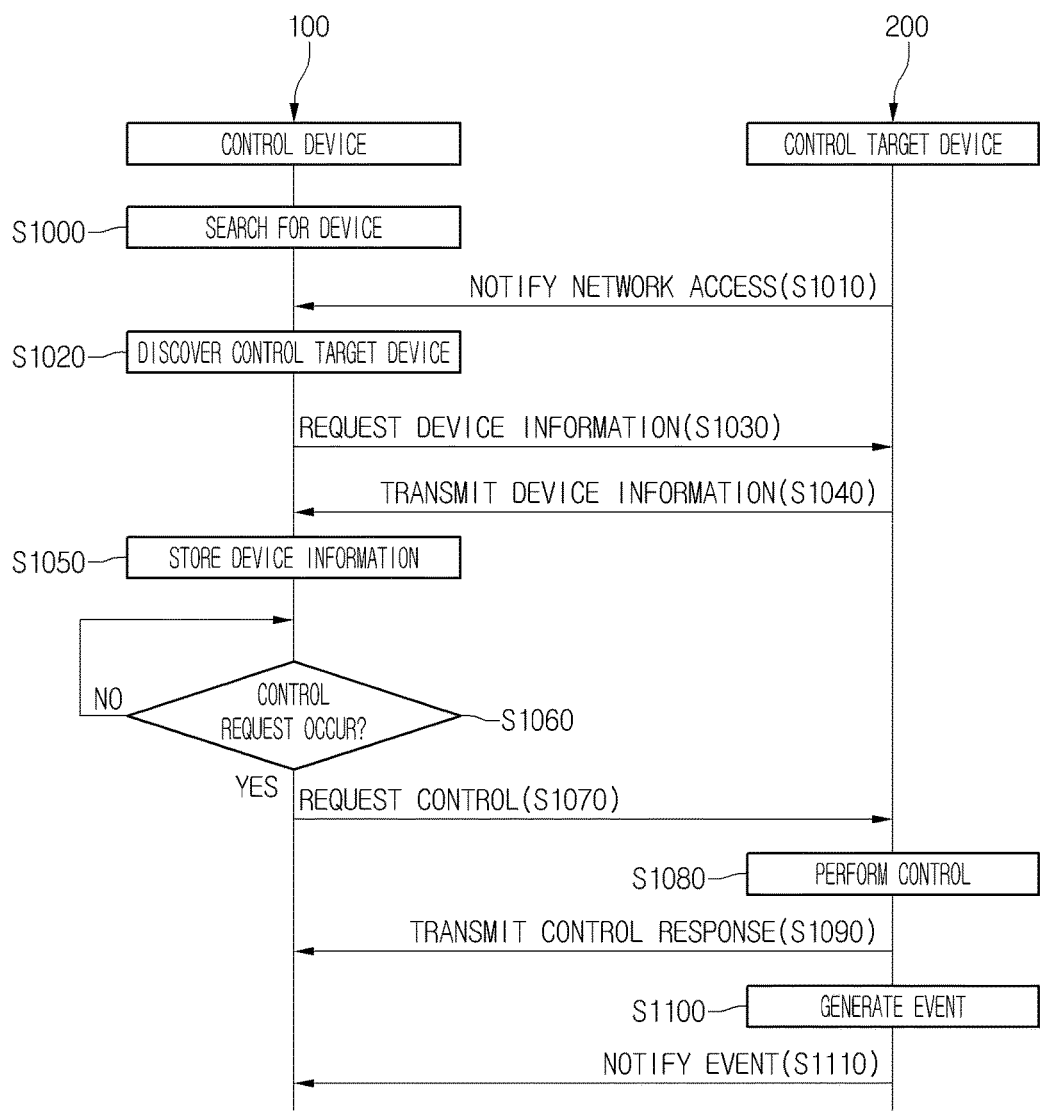
FIG. 2 is a view illustrating a method of operating a control device and a control target device according to an embodiment of the present invention.

FIG. 2 is a view illustrating a connection operation and an event operation of a control device and a control target device according to an embodiment of the present invention.

As shown in FIG. 2, first, the control device 100 accesses a home network and searches for connected devices in operation S1000. For example, when accessing an UPnP home network, the control device 100 searches a Dynamic Host Configuration Protocol (DHCP) server to receive an allocated Internet Protocol (IP) address and port from the server, or when the DHCP server does not operate, automatically selects and obtains an IP address and a port within a predetermined range through an automatic IP designation function (hereinafter, referred to as 'Auto IP'). In such a way, the control device 100 obtaining the IP address and port allocated by the DHCP server or selected by the Auto IP communicates with other devices on the home network through the Transmission Control Protocol (TCP)/IP, and searches for and checks other devices on the home network by using the IP address.

When accessing the home network, the control target device 200 notifies the devices accessing the home network that the control target device 200 accesses the home network in operation S1010. When the control target device 200 accesses the home network, it obtains an IP address and a port in the same way as the control device 100. Accordingly, the control target device 200 multicasts at least one of the identification information, IP address, or port allocated to itself to the devices accessing the network, so that it notifies its access to the network.

Also, the control device 100 discovers the control target device 200 operating on the network in operation S1020. Here, there may be two methods of the control device 100 to discover the control target device 200.

First, when the control target device 200 accesses the network first, there may be a method of discovering the control target device 200 by performing device search. In order for the control device 100 to confirm other devices operating on the network, a search message may be multicasted using the Simple Service Discovery Protocol (SSDP).

The control target device 200 receiving the search message transmitted from the control device 100 may transmit a response message to the control device in response to the received search message through a unicast method. The control device 200 may discover the control target device 200 through such a response message.

Second, when the control device 100 accesses the network first, there may be a method of discovering the control target device 200 by receiving a network access message from the control target device 100. When the control target device 200 accesses the network, an access message on devices on the network may be transmitted through a multicast method by performing operation S1010. Accordingly, the control device 100 receives the access message, thereby discovering the control target device 200.

Then, the control device 100 registers the IP address and port of the discovered control target device 200 and performs message transmission with the control target device 200 by using the registered IP address and port.

After that, the control device 100 request device information on the discovered control target device 200, for example, device information and services that can be provided in the control target device 200, in operation S1030. In order to recognize the services that the control target device provides, the control device 100 may request device information to the control target device 200 through the IP address and port registered in operation S1020. The device information may include a service description file or a device description file in an XML format of the control target device 200.

Then, the control target device 200 transmits the device information, for example, the description file of the XML format, to the control device 100 in response to the device information request in operation S1040.

Also, the control device 100 stores the received device information in correspondence to the corresponding control target device 200 in operation S1050. The stored device information may be provided so that the control device 100 uses a service of the control target device 200. Additionally, the stored device information may be provided so that the control device 100 displays devices accessing a home network and available services to a user.

Then, the control device 100 determines whether a control request to use a service of the control target device 200 occurs by a user input in operation S1060. Also, when the control request occurs, the control device 100 generates control request data including service information of the control target device 200 on the basis of the pre-stored device information (service description) and then transmits it to the control target device 200 in operation S1070. The control request data may be expressed in the XML based SOAP format. Additionally, the control request data may be transmitted through a unicast method for the specific control target device 200.

Then, the control target device 200 receiving the control request performs an operation on the control requested service in operation S1080. The control requested service may include all services available in a digital TV and a mobile phone, which supporting UPnP. Accordingly, the control requested service may include a service for playing a media content transmitted from a media server. Additionally, the control requested service may include an alarm or schedule setting service in a specific device, and may include a service for a text message function, a memory function, or a call function.

Then the control target device 200 performing a service operation in response to a control request transmits a control response message according to its result to the control device 100 in operation S1090. The control target device 200 may perform the above-mentioned various services in response to a control request.

Also, the control target device 200 may generate a response message according to an execution result. The response message may include a result on whether a service operation is successfully performed or an error code. The error code may include at least one of an unsupported request, wrong arguments setting, and corresponding service absence. Then, the generated response message may be transmitted to the control device 100 as a data expressed in the XML based SOAP format.

Moreover, when an event is set in response to the control request of the control device 100 or an event occurs due to a state change in the control target device 200 in operation S1100, the control target device 200 transmits event information (or an event message) to the control device 100 in operation S1110.

For example, when an alarm is set on the control target device 200, the control target device 200 may generate an event as a set time arrives. Additionally, when the control target device 200 terminates an access from the home network, an event may occur.

Accordingly, such an event message may include information on device information and information on the occurring event. The control target device 200 may transmit an event message to the specific control device 100, or all devices accessing the network through multicast without specifying a control device. The event message may include data expressed in the XML based GENA format.

Figure 3:
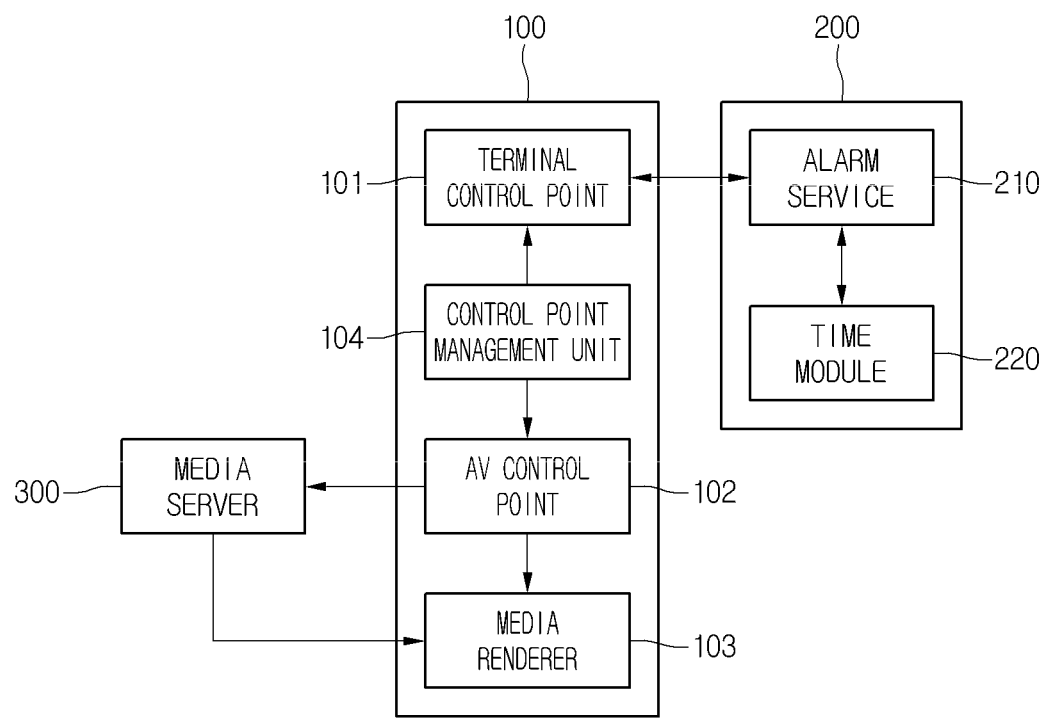
FIG. 3 is a view illustrating a control device and a control target device according to an embodiment of the present invention.

FIG. 3 is a view illustrating a home network including a media server, a control device, and a terminal as a control device and a control target device according to an embodiment of the present invention.

Referring to FIG. 3, the home network including a control device and a control target device may include a control device 100, a terminal 200, i.e., a control target device, and a media server 300.

The control device 100 may include a control point to control the terminal 200 and the media server 300, and each control point may control and use a service provided from the terminal 200 and a service provided from the media server 300. For this, the control device 100 may include a terminal control point 101, an AV control point 102, a media renderer 103, and a control point management unit 104.

The terminal control point 101 sets a connection with the terminal 200, i.e., a control target device accessing the home network, through the discovery or search operation of the control target device, and receives service description from the terminal 200. Then, the terminal 200 transmits a control request for a service that can be provided, for example, alarm service, and receives a response.

The AV control point 102 sets a connection with the media server 300 or the media renderer 103, i.e., a control target device accessing the home network, through the discovery or search operation of the control target device, and receives device information from each control target device.

Especially, the service description received by the media server 300 may include metadata of a content that the media server 300 can provide. Additionally, the AV control point 102 may request a corresponding content to be transmitted from the media server 300 to the media renderer 103 as media stream on the basis of the content metadata.

The control point management unit 104 manages the terminal control point 101 and the AV control point 102 and controls an operation of each control point to use necessary service according to a user input. For this, the control point management unit 104 may include an additional processor and memory therein.

The media server 300, as a control target device, may transmit content metadata that the media server can provide in response to a request of the AV control point 102, or may transmit content itself to another device as media stream. That is, the media server 300 may be a kind of UPnP based file system including video, music, and images. The media server 300 may be one of devices such as a PC, a DVD player, a settop box, a digital TV, and a smart phone, which support UPnP.

The media renderer 103, as a control target device, accesses the media server in response to a request of the AV control point 102 and receives media stream on a corresponding content, and plays the received content. Like the media server 300, the media renderer 130 may be capable of accessing the media server 300, and may be included in one of devices such as a PC, a DVD player, a settop box, a digital TV, and a smart phone, which support UPnP.

Moreover, the terminal 200, as a control target device, performs a service that the terminal 200 can provide in response to a request of the terminal control point 102. According to an embodiment of the present invention, the terminal 200 may include an alarm service 210 and a time module 220. Accordingly, the terminal control point 101 accesses the terminal 200 to use the alarm service 210, so that it may set an alarm to be generated at a specific time. The terminal 200, as a portable terminal, may be one of a tablet PC or a smart phone supporting UPnP.

Accordingly, the control device 100 requests the alarm service 200 to the terminal 200 to generate an alarm at a specific time, and when an alarm occurs, receives a content from the media server 300 to control a desired content to be played through the media renderer 103. Accordingly, the control device 100 includes the media renderer 103 and may be one of devices such as a PC, a DVD player, a settop box, a digital TV, and a smart phone, which support UPnP.

Figure 4:
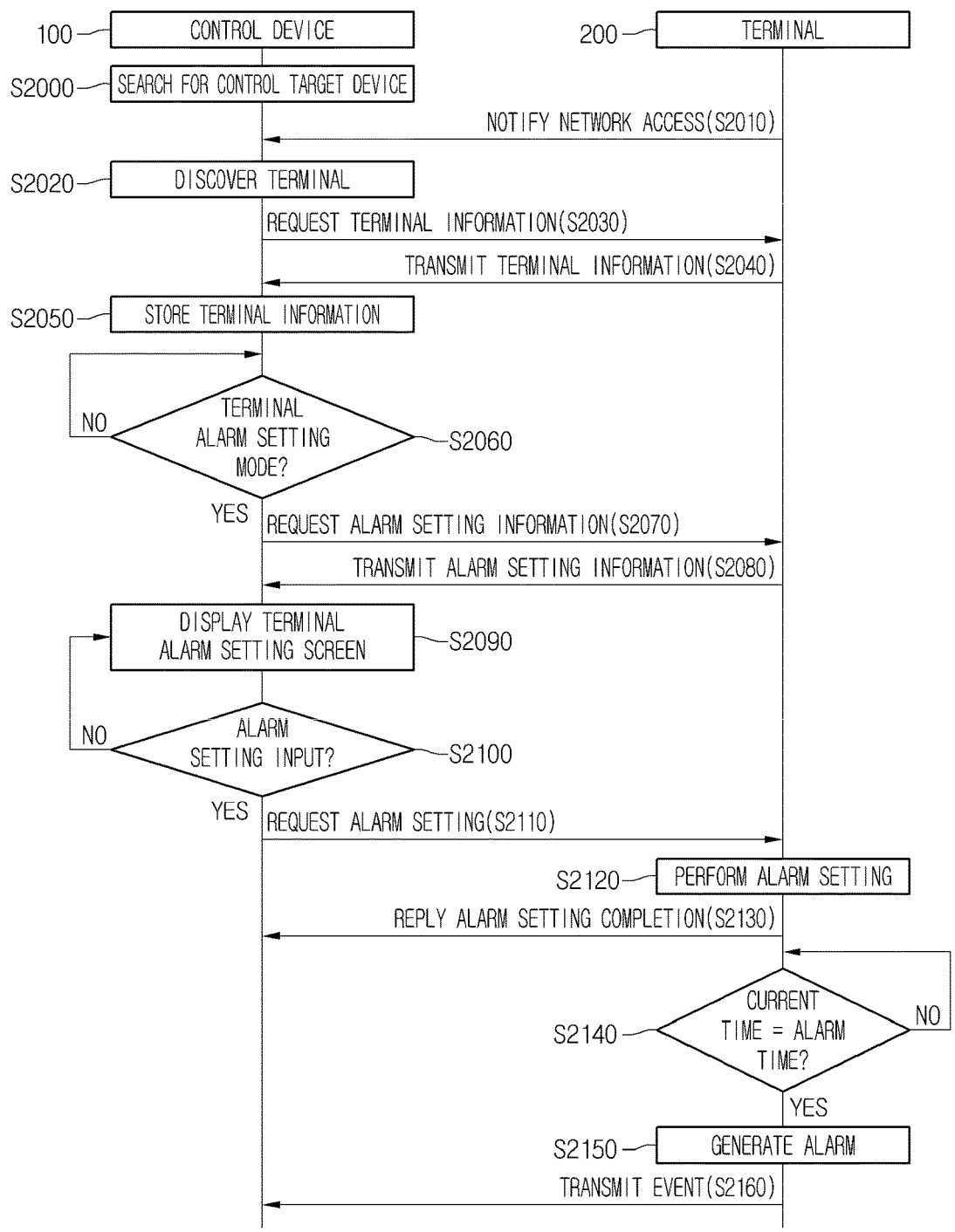
FIG. 4 is a view illustrating a method of setting an alarm of a control device and a control target device according to an embodiment of the present invention.

FIG. 4 is a view illustrating a method of a control device to use an alarm service of a terminal.

First, the control device 100 performs a search to determine whether the terminal 200, i.e., a control target device, accesses an UPnP home network through the terminal control point 101 by using the method in operation S2000 Then, when accessing the home network, the terminal 200 notifies network access by using a multicast method in operation S2010.

Then, the control device 100 may receive a network access alarm from the terminal 200 through the terminal control point 101, or discovers the terminal 200 through a search process and registers the IP address and port information of the terminal in operation S2020.

Then, the control device 100 requests terminal information to the terminal 200 to recognize service information on the registered terminal 200 through the terminal control point 101 in operation S2030. In response to that, the terminal transmits device information on the terminal 200 and terminal information including service description to the control device 100 in operation S2040.

Then, the control device 100 stores terminal information received through the terminal control point 101 in operation S2050, and recognizes services that a terminal can provide. A user recognizes services that a terminal provides on the basis of the terminal information stored in the control device 100 and uses a desired service.

Especially, according to an embodiment of the present invention, the terminal 200 may provide the alarm service 210. Accordingly, a user of the control device 100 may use the alarm service 210 of the terminal 200 at a different place through the control device 100.

Then, the control device 100 may determine whether the control device 100 enters a terminal alarm setting mode in order to use the alarm service 210 in operation S2060. The control device 100 may enter the terminal alarm setting mode by a user's input. For this, the control device 100 may notify a user whether an alarm service is available on the basis of the terminal information received from the terminal 200.

Additionally, the control device 100 may provide whether the alarm service of the terminal 200 is available as a graphic user interface (GUI) form. That is, when the terminal 200 accesses a home network, the control device 100 determines whether an alarm service is available on the basis of the service description of the terminal 200, and displays it to a user. Accordingly, the user may make an input to enter the alarm setting mode by using the displayed alarm service available GUI.

Then, when entering the alarm setting mode, the control device 100 requests alarm setting information on the alarm service 210 of the terminal through the terminal control point 101 in operation S2070. Then, the terminal 200 receiving an alarm setting information request loads currently set alarm setting information through the alarm service 210, and transmits alarm setting information as a response message in operation S2080. Here, alarm setting information may include alarm time information including an alarm time and alarm event information including a content to be played at an alarm time, an alarm method, or a message to be displayed.

Moreover, when alarm setting information is transmitted, the control device 100 displays a terminal alarm setting screen on the basis of the alarm setting information in operation S2090. The terminal alarm setting screen may be expressed in a GUI format for user's convenience. Here, at least one of an alarm time, a content to be played, an alarm method, or a message to be displayed included in the terminal alarm setting information may be displayed on the terminal alarm setting screen.

Also, the control device 100 determines whether terminal alarm setting is inputted in operation S2100. A user may input a terminal alarm setting on the basis of the terminal alarm setting screen. Here, the inputted terminal alarm setting information may include at least one of the alarm time, the content to be played, the alarm method, and the message to be displayed.

The control device 100 displays the alarm setting screen by repeatedly performing operation S2090 if the alarm setting is not inputted. On the contrary, when the alarm setting is inputted, the control device 100 requests an alarm setting request to the alarm service 201 of the terminal 200 through the terminal control point 101 on the basis of the inputted alarm setting information in operation S2110. The transmitted alarm setting request data may include data expressed in the XML based SOAP format.

Then, the terminal 200 receiving an alarm setting request performs alarm setting through the alarm service 210 in operation S2120. The terminal 200 sets its alarm through the alarm service 210 on the basis of at least one of an alarm time, a content to be played, an alarm method, or a message to be displayed, which are included in the alarm setting information.

Then, when an alarm is set, the terminal 200 transmits a setting completion response message to the terminal control point 101 of the control device 100 through the alarm service 210 in operation S2130.

Then, the terminal 200 compares a current time outputted from the time module 220 with an alarm time through the alarm service 210 to determine whether they are identical in operation S2120.

Then, when the current time is identical to the alarm time, the terminal 200 generates an alarm through the alarm service 210 in operation S2150, and generates event information to be transmitted according to the alarm setting information to be multicasted to devices connected to a network in operation S2160. That is, the terminal 200 plays a specific content at a specific alarm time through the alarm service 210, or displays a specific message, and also transmits event data based on the alarm setting information to the network connected devices including the control device 100. Accordingly, when receiving the event data, the control device 100 may perform a proper operation by processing the received event data.

Figure 5:
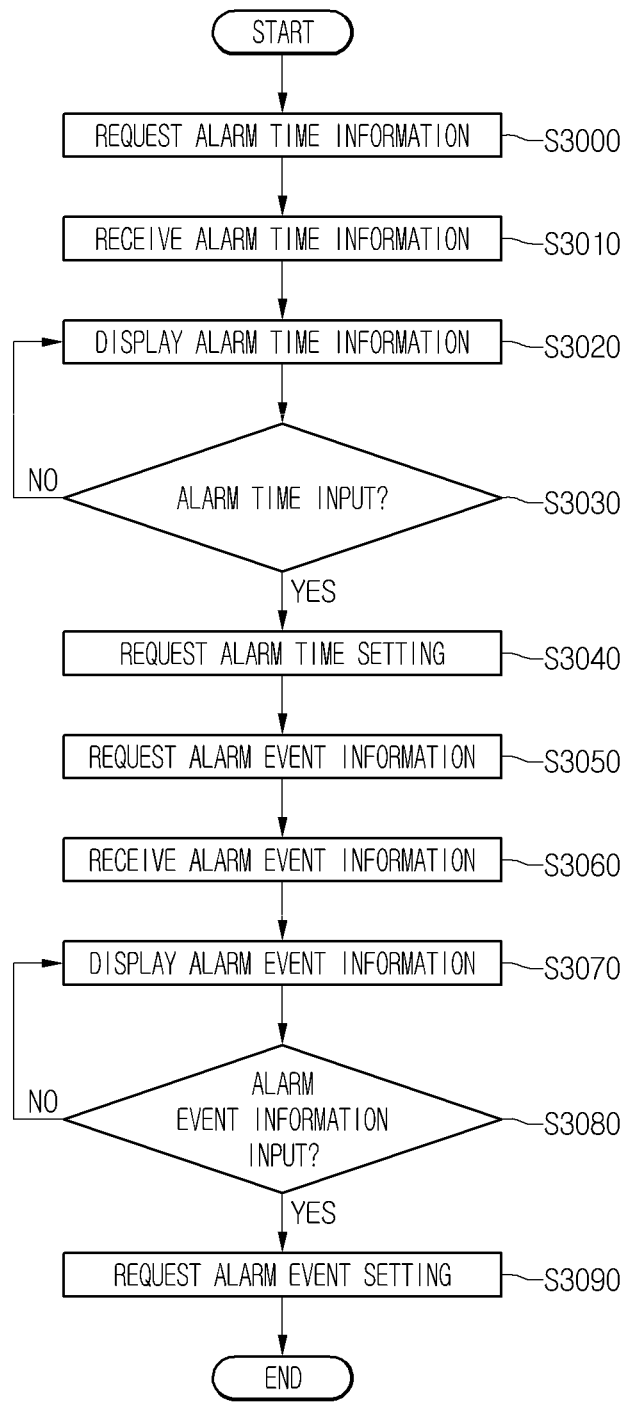
FIG. 5 is a view illustrating a method of setting an alarm of a control device and a control target device according to another embodiment of the present invention.
Figure 6:
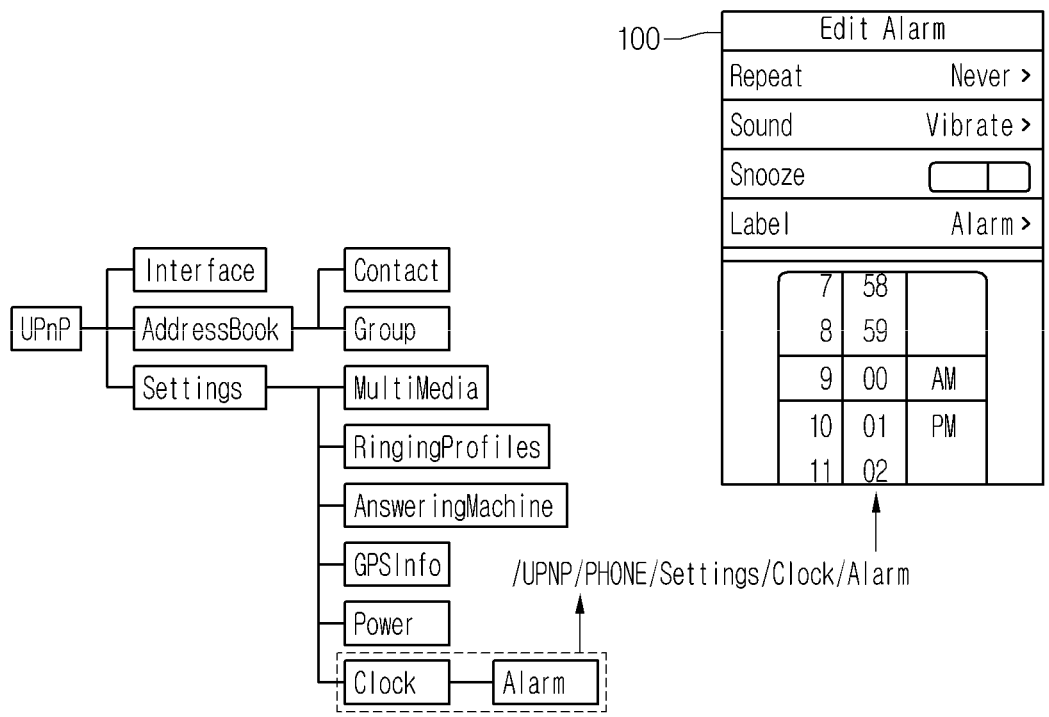
FIG. 6 is a view illustrating a structure of alarm setting information data according to an embodiment of the present invention.

FIG. 5 is a view illustrating a method of the control device 100 to set an alarm of the terminal 200 according to another embodiment of the present invention. FIG. 6 is a view illustrating a structure of alarm setting information data according to an embodiment of the present invention.

Before describing an operation of the control device 100 shown in FIG. 5, as mentioned above, connection setting and alarm setting mode entry according to a search and discovery process with the terminal 200 are performed.

First, the control device 100 requests alarm time information to the alarm service 210 of the terminal 200 through the terminal control point 101 in operation S3000.

Here, since the alarm time information is not defined on an UPnP data structure, the alarm service 210 newly defines and generates an UPnP/PHONE/Settings/Clock/Alarm instance including the alarm setting information and transmits/receives the alarm time information by using a corresponding instance or sets an alarm. FIG. 6 is a view illustrating an UPnP data structure newly defined for transmitting/receiving such alarm setting information.

Referring to FIG. 6, an UPnP service that the terminal 200 can provide may include interface, AddressBook, and Settings services. In more detail, the AddressBook service may include Contact service and Group service. The Setting service may include MultiMedia, RingProfiles, AnsweringMachine, GPSInfo, and Power.

Also, according to an embodiment of the present invention, alarm setting may be easily made between the control device 100 and the terminal 200 by newly defining a Clock instance and an Alarm instance as its dependent instance in the Settings instance.

Especially, a structure of alarm setting information data for alarm time setting may be shown as the following Table 1.

TABLE 1

| Name | Type | Acc. | Req | Description | EOC | Ver |
|---|---|---|---|---|---|---|
| /UPnP/ PHONE/ Settings/ Clock/Alarm | Single Instance | — | 0 | This node includes basic setting for alarm | — | — |
| Enable | boolean | W | R | Indicate alarm activation | — | — |

TABLE 1-continued

| Name | Type | Acc. | Req | Description | EOC | Ver |
|---|---|---|---|---|---|---|
| | | | | or deactivation 0 = Disable (default value) 1 = Enable | | |
| AM/PM | boolean | W | R | 0 = AM (default value) 1 = PM | — | — |
| Hour | unsignedint | W | R | Values are from 0 to 12 | — | — |
| Minute | unsignedint | W | R | Values are from 0 to 59 | — | — |

As shown in Table 1, the alarm setting information may be placed in an UPnP data structural SingleInstance of /UPnP/PHONE/Settings/Clock/Alarm, and may include four information as shown in Table 1.

Enable(boolean) indicates whether an alarm is activated. A default value is set to 0 (deactivation).

AM/PM(boolean) indicates whether a set alarm time is AM or PM. A default value is set to 0 (AM).

Hour and Minute have values indicating an alarm time and minute, and Hour may have a value of 0 to 12 and Minute may have a value of 0 to 59.

Accordingly, convenient and fast alarm setting is possible by using a configuration of the alarm setting information of Table 1 and the data structure of FIG. 6.

Moreover, the alarm setting information may include alarm event information occurring at an alarm time in addition to alarm time information. The alarm event information may include at least one of the content to be played, a message to be displayed, and an alarm method. This will be described later.

As described above, the control device 100 requests alarm time information by using the alarm setting information data structure and receives preset alarm time information of the terminal 200 in response to the request in operation S3020. Then, the control device 100 displays alarm time information on the basis of the received alarm time information in operation S3020.

Then, the control device 100 determines whether an alarm time is inputted from a user in operation S3030, and when the alarm time is inputted, requests alarm time setting to the terminal 200 in operation S3040. The control device 100 recognizes that the alarm time setting is completed by receiving the response from the terminal 200.

After the alarm time setting completed, the control device 100 requests alarm event information to the alarm service 210 of the terminal 200 through the terminal control point 101 in operation S3050. The alarm event information may include information on an operation that the terminal 200 needs to perform when an alarm occurs. Then, the control device 100 receives the alarm event information in operation S3060 and displays an alarm event setting screen on the basis of the received alarm event information in operation S3070. The alarm event setting screen may be displayed in a GUI format for user input. The control device 100 of FIG. 6 displays such an alarm event setting screen.

According to an embodiment, the alarm event information may include alarm method information. The alarm method information may include at least one of whether to repeat, whether to vibrate, and whether to set Snooze.

Moreover, according to an embodiment, the alarm event information may include content information to be played at an alarm time. The content information may include metadata of specific data stored in the media server 300. Accordingly, when an alarm event occurs, an alarm target device such as the terminal 200 may receive a media stream of set content from the media server 300 by using the content information, and play the received media stream.

Moreover, according to an embodiment, the alarm message information may include a label corresponding to the alarm event information or a message in a text format to be displayed at an alarm time. Accordingly, when an alarm event occurs, an alarm target device such as the terminal 200 may display a corresponding message.

The control device 100 displays such alarm event information and determines whether there is an input from a user in operation S3080. When the alarm event information is inputted, the terminal control point 101 of the control device 100 transmits an alarm event setting request as XML based SOAP format data to the alarm service 210 of the terminal 200 in operation S3090.

Through the above processes, the control device 100 accessing an UPnP network may set an alarm by using the terminal 200. Additionally, the terminal 200 recognizes an alarm in another device accessing a network by generating an alarm at a set alarm time and multicasting event information, and provides a device linkage environment to perform an operation corresponding thereto.

Figure 7:
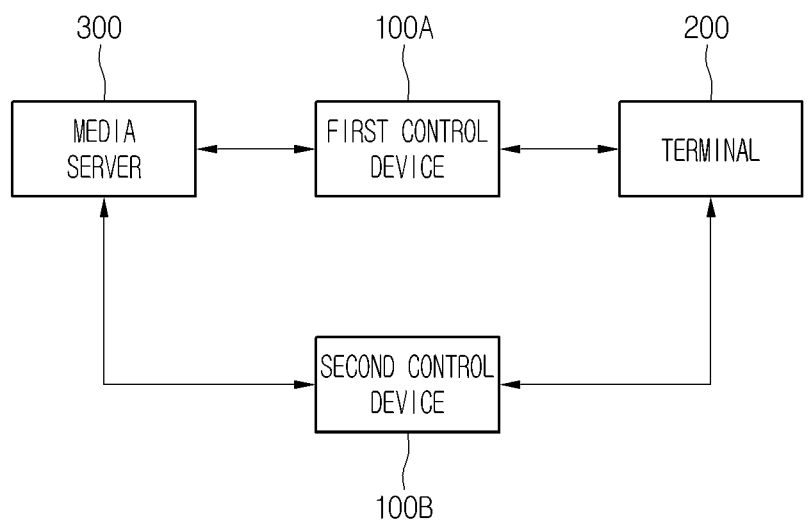
FIG. 7 is a view illustrating a configuration of a home network according to another embodiment of the present invention.

FIG. 7 is a view illustrating a configuration of a home network system including a control device and a control target device according to another embodiment of the present invention.

Referring to FIG. 7, the home network system may include a first control device 100A for alarm setting as a control device, a second control device 100B performing an operation by an alarm as a control device, a terminal 200 having a set alarm as a control target device, and a media server 300 as a control target device. A plurality of control devices and a plurality of control target devices may access a network through the UPnP technology based connection process described with reference to FIG. 2.

Then, the first control device 100A may include the terminal control point (not shown) and the AV control point (not shown). The first control device 100A requests a registration to the terminal 300, receives a registration list and alarm setting information from the terminal 300, and receives metadata of playable content from the media server 300.

Additionally, the first control device 100A displays the received registration list, alarm setting information and content metadata in a GUI format, and receives alarm target control device and alarm time information and metadata of a content to be played from a user through GUI.

Then, the first control device 100A generates alarm setting request data according to the alarm target control device, alarm time information, and metadata of a content to be played inputted from the user and transmits the generated alarm setting request data to the terminal 200.

Moreover, the terminal 200 analyzes the alarm setting request through the alarm service to store it and set an alarm, and determines whether a current time is identical to an alarm set time through a time module. When the current time is identical to the alarm time, the terminal 200 multicasts alarm event information including the alarm target device and the alarm information to devices accessing a home network to perform an alarm.

Moreover, the second control device 100B may include the terminal control point (not shown), the AV control point (not shown), and media renderer (not shown), and receives alarm event information multicasted from the terminal 200 to determine whether it corresponds to an alarm target device. When it is determined that the second control device 100B corresponds to the alarm target device, the second control device 100B parses content metadata from event information, and on the basis of this, accesses the media server 300 through an AV control point. Then, the second control device 100B controls a media stream of a corresponding content to be transmitted to a media renderer through an AV control point, and controls a corresponding content to be played in the media renderer.

Accordingly, the second control device 100B receives a corresponding content from the media server 300 on the basis of the alarm event information occurring at a set alarm time in the terminal 200, and plays the received corresponding content. That is, the second control device 100B, i.e., an alarm target device, receives a content from the media server 300 at an alarm time set in the terminal 200 through the first control device 100A and plays the received content, so that an alarm is made Therefore, according to an embodiment of the present invention, a user may set the alarm function of the terminal 200 by using the first control device 100A, and also when an alarm occurs in the terminal 200, may set to play a content in the second control device 100B, i.e., another device.

Figure 8:
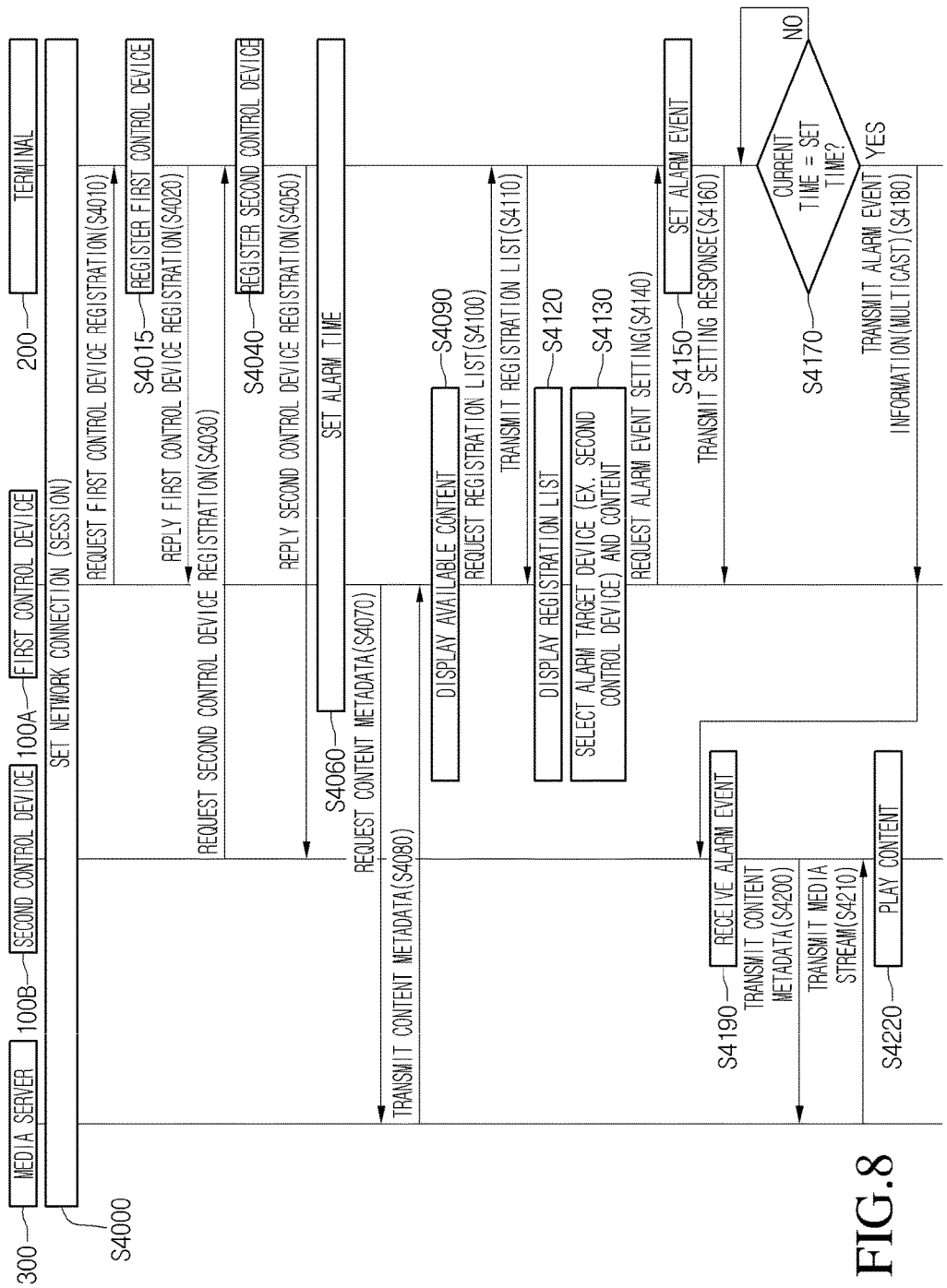
FIG. 8 is a flowchart illustrating a method of setting an alarm according to another embodiment of the present invention.

FIG. 8 is a flowchart illustrating a method of setting an alarm according to another embodiment of the present invention.

As shown in FIG. 8, the first control device 100A sets an alarm by using the alarm service of the terminal 200, but sets an alarm target device as the second control device 100B. However, the present invention is not limited to an alarm setting subject and an alarm target device. That is, a user may set the first control device 100A or the terminal 200 as an alarm target device through the second control device 100B, and the first control device 100A may set an alarm target device as the first control device 100A itself or the terminal 200.

First, the first control device 100A, the second control device 100B, the terminal 200, and the media server 300 may set a network connection (session) in operation S4000. The network connection setting may include the UPnP device search and discovery process and a process for storing an IP address and a port address of each device.

That is, each control point included in the first control device 100A searches for and discovers UPnP devices including the media renderer of the second control device 100B, the terminal 200, and the media server 300 connected on the UPnP home network, and sets a session through a process for receiving each device information. Additionally, each control point included in the second control device 100b searches for and discovers UPnP devices including the media renderer of the first control device 100B, the terminal 200, and the media server 300 connected on the UPnP home network, and sets a session through a process for receiving each device information.

Then, the first control device 100A transmits a first control device registration request message to the terminal 200 in operation S4010. The terminal 200 registers a first control device in an alarm target device list, i.e., a target of the alarm service, in response to the device registration request in operation S4015. Then, the fact that the first control device is registered in the alarm target device list is transmitted through a response message in operation S4020. The device registration request message may be expressed in the XML based SOAP format, and will be described later.

Moreover, the second control device 100B transmits a second control device registration request message to the terminal 200 in operation S4030. In the same manner, the terminal 200 registers a second control device in an alarm target device list, i.e., a target of the alarm service, in response to the device registration request in operation S4040. Then, the terminal 200 transmits the fact that the second control device is registered to the second control device 100B through a response message in operation S4050.

Then, the first control device 100A sets an alarm time through data transmission with the terminal 200 in response to a request of a user in operation S4060.

The alarm time setting method between the first control device 100A and the terminal 200 in operation S4060 may includes the method shown in FIG. 4 and order modified various methods That is, in response to a request of a terminal control point in the first control device 100A, an alarm time is set, and when the terminal control point of the terminal 200 is included, the terminal 200 itself may set an alarm time through the terminal control point.

Additionally, a data structure for alarm time setting is shown in FIG. 6, and alarm time setting information shown in Table 1 is used. That is, the alarm time information may be set by using an UPnP data structural UPnP/PHONE/Settings/Clock/Alarm instance of the terminal 200.

Additionally, the first control device 100A displays a GUI for alarm time setting and receives an alarm time from a user, and then, transmits the alarm time to the terminal 200, so that an alarm time is set. Moreover, the terminal 200 displays a GUI through a display unit equipped in the terminal 200, and receives an alarm time from a user to set an alarm.

Then, when the alarm time is set, the first control device 100A requests content metadata to the media server 300 through an AV control point in operation S4070. The content metadata may be stored in the media server 300, or may include list and path information for contents that can be transmitted. That is, content metadata may include list and path information of a content that an alarm target device is to play at an alarm time. The content metadata request message may include a CDS::Browse( )/Search( ) command for content directory service (CDS) in the media server 300.

Then, the media server 300 transmits a list of contents that can be transmitted, i.e., metadata, through a content directory service, in response to the content metadata request message in operation S4080.

Then, the first control device 100A displays a list of contents that can be transmitted from the media server 300 on the basis of the received content metadata in operation S4090. The first control device 100A may display to a user a list of contents that can be played through the media server 300 when an alarm event occurs, and through this, the user may select a content to be played in correspondence to a specific alarm time.

Then, the first control device 100A requests a list of devices registered in the alarm service of the terminal 200 through a terminal control point in operation S4100, and receives a registration device list from the alarm service of the terminal 200 in operation S4110. The registration device list may include at least one of list data in an XML format, ID information of a registered device, IP information of a registered device, or port information.

The first control device 100A displays a list of devices that can be set as an alarm target on the basis of the received registration device list in operation S4120. A user may select an alarm target device that is to be set as an alarm target from the list displayed on the first control device 100A.

That is, when the first control device 100A displays a selectable content and a list of devices that can be set as an alarm target, a user selects an alarm target device in correspondence to a content to be played at an alarm time in operation S4130. Here, the alarm target device may be one control device. Additionally, the alarm target device may include a plurality of control devices. Accordingly, a user may select a plurality of respectively corresponding contents in correspondence to a plurality of control device lists.

Then, the first control device 100A generates alarm event information on the basis of the alarm target device and content selected by a user, and transmits an alarm event setting request message including the alarm event information to the alarm service of the terminal 200 through a terminal control point in operation S4140. The alarm event information may include information for identifying an alarm target device, i.e., at least one of identification information, IP information, and port information corresponding to an alarm target device.

Then, if an alarm target device is provided in plurality, the alarm event information may include identification information on the plurality of alarm target devices. In this case, the alarm event information may further include an alarm time and content metadata set in correspondence to each alarm target device.

Additionally, the alarm event information may include metadata of a content that the alarm target device receives from the media server 300 and plays. A data format of the alarm event setting request message may vary, and a different format of data may be used according to a type of an alarm service provided from the terminal 200.

Moreover, the terminal 200 receiving an alarm event setting request receives an alarm event setting request through an alarm service, and sets an alarm event to correspond to a set alarm time on the basis of alarm even information included in the received alarm event request in operation S4150. Then, the terminal 200 transmits a setting response including completion or error code to the first control device 100A when setting is completed or an error occurs in operation S4160.

Then, when an alarm is set, the alarm service of the terminal 200 may determine whether a current time is identical to an alarm set time through a time module in operation S4170. When a set alarm time is provided in plurality, the alarm service determines whether an alarm time arriving first is identical to a current time.

Then, when it is determined that the current time is identical to the alarm time, the terminal 200 multicasts alarm event information, S4180, on devices connected to a home network through the alarm service on the basis of the alarm setting information in operation S4130.

The alarm event information transmitted through multicast may include an alarm target control device and content metadata. Accordingly, a corresponding alarm target control device receives alarm event information to perform an alarm. Especially, since the alarm event information is multicasted, when an alarm target control device is set in plurality, a plurality of alarm target control devices set by a user receive event information to perform an alarm. Accordingly, in setting an alarm, linkage between each device connected to a home network may be increased.

However, as mentioned above, according to the embodiment of FIG. 8, it is assumed that the second control device 100B is set as an alarm target device. Accordingly, an operation of when an alarm event is received is described on the basis of the second control device 100B.

First, the second control device 100B receives an alarm event transmitted from the terminal 200 in operation S4190. The second control device 100B receiving an alarm event determines whether the second control device 100B is included in the alarm target device. If the second control device 100B is included in the alarm target device, the second control device 100B further receives content metadata from the terminal 200 to perform an alarm. Content metadata may be included in an alarm event and transmitted, but may be transmitted in response to a request of an alarm target device.

Then, the second control device 100B transmits the content metadata received through an AV control point to the media server 300 in operation S4200. Then, the second control device 100B controls a media stream corresponding to the content metadata, from the media server 300 to the second control device 100B through the AV control point in operation S4210. That is, the media server 300 may transmit a media stream corresponding to a content inputted when a user sets an alarm.

Also, the transmitted media stream is played by the media renderer in the second control device 100B in operation S4220. Through such a process, a user may set an alarm for the second control device 100 by using the terminal 200 in the first control device 100A, and may set a content to be played that the second control device 100B receives from the media server 300. That is, through the control device and the control target devices of the present invention, various devices accessing a home network are linked to perform an alarm event.

Figure 9:
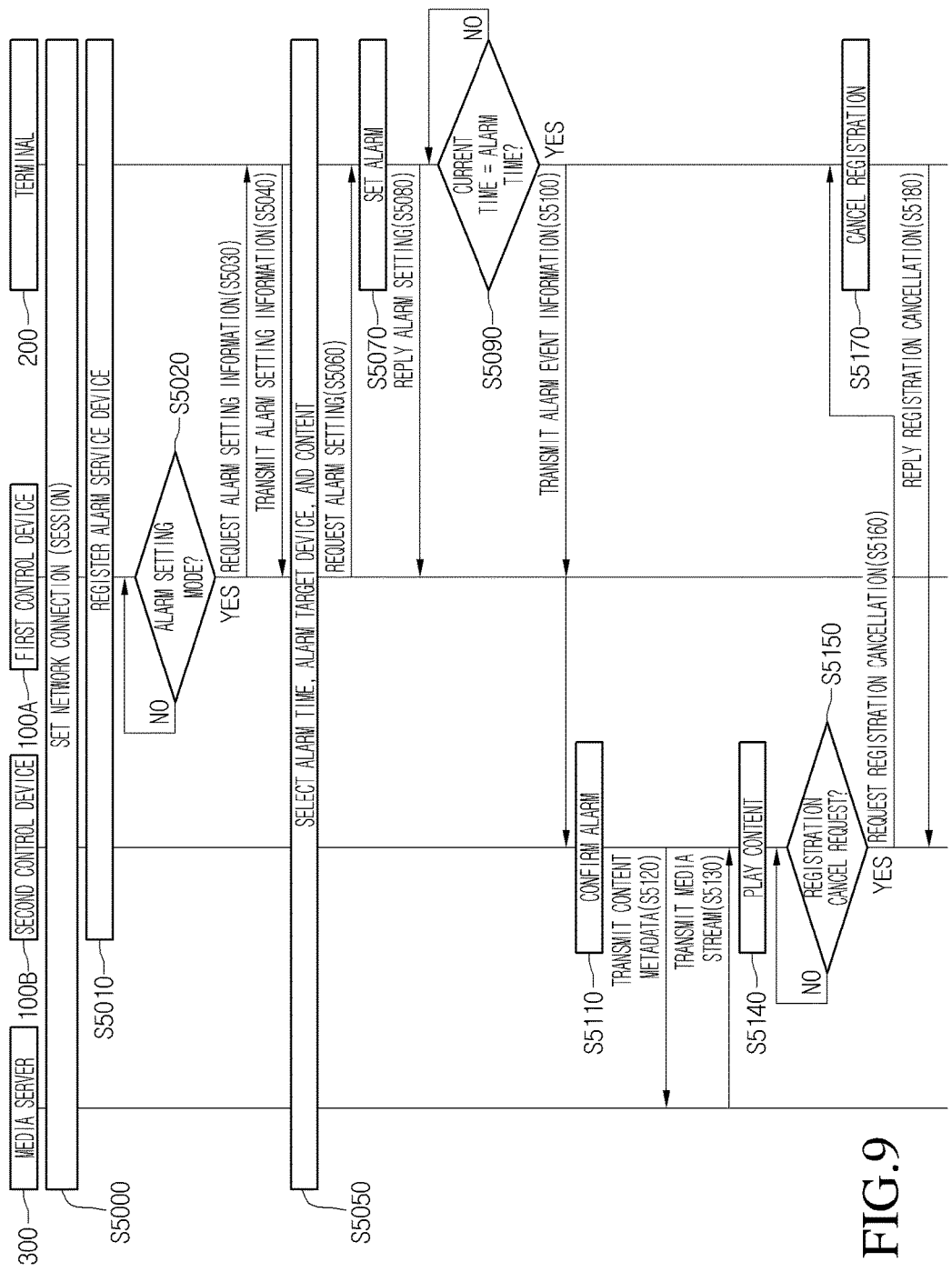
FIG. 9 is a flowchart illustrating a method of setting an alarm according to another embodiment of the present invention.

FIG. 9 is a flowchart illustrating a method of setting an alarm according to another embodiment of the present invention.

According to an embodiment, like FIG. 8, the alarm setting method shown in FIG. 9 sets a second control device as an alarm target device and performs an alarm. And, based on this, the method is described. Also, unlike FIG. 8, a device may be deleted from an alarm target device after performing an alarm in the flowchart of FIG. 9.

First, the first control device 100A, the second control device 100B, the terminal 200, and the media server 300 may set a network connection (session) in operation S5000. Then, the first control device 100A and the second control device 100B request a registration request to the alarm service of the terminal 200, and then, a registration for each device is performed in the alarm service of the terminal 200 in operation S5010. Since the device registration and the network connection setting are substantially identical to those described with reference to FIG. 8, their descriptions are omitted.

Then, the first control device 100A determines whether it enters an alarm setting mode in operation S5020. The first control device 100A may enter the alarm setting mode by user's setting or terminal's access. Then, when it is determined that the first control device 100A is in the alarm setting mode, the first control device 100A requests alarm setting information set in the current terminal 200 to the terminal 200 through a terminal control point in operation S5030. Then, the terminal transmits the requested alarm setting information through the alarm service in operation S5040. The alarm setting information may include alarm time information and alarm event information, and the alarm event information may include an alarm target device and content metadata.

Then, an alarm time, an alarm target device, and content metadata are selected by a user in operation S5050. The first control device 100A receiving the alarm setting information may display the alarm setting information set in the current terminal 200. Additionally, as described with reference to FIG. 8, the first control device 100A may receive a registration device list from the terminal 200 and content metadata from the media server 300, and then may display them. Accordingly, a user may select an alarm time, an alarm target device, and a content to be played at an alarm time on the basis of the displayed information.

Then, the first control device 100A generates alarm setting information according to the selected alarm time, alarm target device, and metadata on content, and then transmits an alarm setting request message to the terminal 200 in operation S5060. The terminal 200 receives the alarm setting information through the alarm service, and based on this, sets an alarm in operation S5070. Then, the terminal 200 transmits a completion message or error code of the alarm setting as response data to the first control device 100A in operation S5080.

Moreover, it is determined whether a current time is identical to an alarm time according to the alarm setting in operation S5090. When the current time is identical to the alarm time, an alarm occurs on the basis of the alarm setting information, and alarm event information is transmitted through multicast in operation S5100.

Then, the second control device 100B confirms an alarm target device of the alarm event information in operation SS110. When the alarm target device is confirmed as the second control device 100B, the second control device 100B transmits the content metadata to the media server 300 through the same method as FIG. 8 in operation S5120, and receives a media stream corresponding thereto to play the received content in operation S5140.

Moreover, the second control device 100B determines whether a registration cancel request occurs in operation S5150. The second control device 100B may transmit a registration cancel request to the terminal 200 to delete it from an alarm service using device list registered in the terminal 200. The registration cancel request may be generated by a user's input, or may be generated by a predetermined cancel condition.

Moreover, when the registration cancel request occurs, the second control device 100B transmits a registration cancel request message to the terminal in operation S5160. The terminal 200 deletes it from the alarm service using device according to the registration cancel message received through the alarm service in operation S5170, and transmits a completion or deletion failure message according thereto as a response to the second control device 100B in operation S5180.

Figure 10:
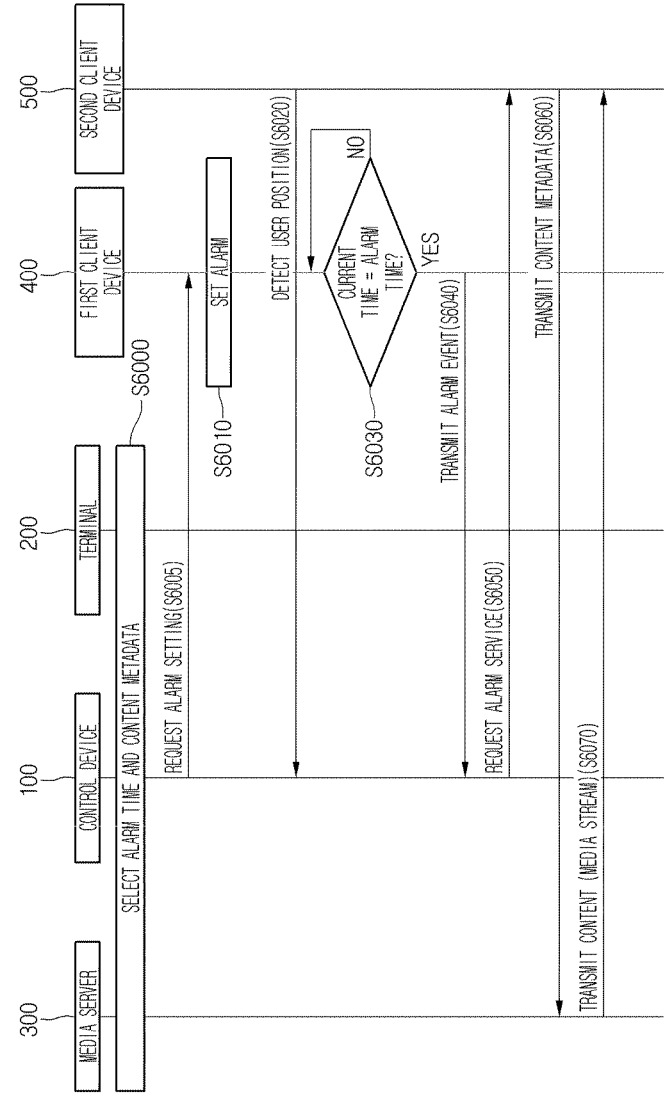
FIG. 10 is a flowchart illustrating a method of setting an alarm according to another embodiment of the present invention.

FIG. 10 is a view illustrating a method of operating a control device and a control target device according to another embodiment of the present invention.

As shown in FIG. 10, the control device 100, the terminal 200, and the media server 300 are identical to those described with reference to FIG. 3, and a first client device 400 and a second client device 500 as each control target device may perform alarm service in response to a request of the control device 100.

First, the terminal 200 transmits alarm setting information to the control device 100, and the media server transmits content metadata to the control device 100 in operation S6000. The control device may select an alarm time and content metadata according to a user input, and since its processes are identical to those described with reference to FIGS. 8 and 9, their descriptions are omitted.

Moreover, the control device 100 generates an alarm setting request message according to the selected alarm time and content metadata, and transmits it to the first client device 400. The alarm service of the first client device sets an alarm according to the received alarm setting information in operation S6010.

Moreover, when a user's position is detected around the second client device 500, the second client device 500 transmits a user position detection event to the control device 100 in operation S6020. A user position detecting method may include typical methods such as infrared detection, camera detection, and ultrasonic detection. The second client device 500 generates a position detection event when a user is positioned with a predetermined distance through the method, and then transmits it to the control device 100. The transmitted position detection event may include user position information or identification information of a client device detecting a user's position. Accordingly, the control device 100 may receive or store position information of a client device close to a user.

According to an embodiment, the second client device 500 may detect the position, but the present invention is not limited to types of client devices. Accordingly, at least one device capable of detecting a user position among UPnP supporting devices connected to a home network detects a user position and transmits a detection result to the control device 100.

Moreover, the first client device 400 determines whether an alarm time arrives in operation S6030. Then, when the alarm time arrives, the first client device 400 transmits an alarm event to the control device 100 in operation S6040. The first client device 400 may transmit an alarm event on the basis of the predetermined alarm setting information. For example, the alarm event may include metadata of a content to be played at an alarm time. Additionally, the first client device 400 may transmit an alarm event to the control device 100 through a multicast or unicast method.

Then, the control device 100 transmits an alarm service execution request to the second client device 500 in operation S6050. The second client device 500 as a device detecting a user position may be a control target device closest to a user. Accordingly, since the control device 100 allows the alarm service to be performed in the control target device closest to a user, effective alarm execution is possible.

Moreover, the alarm service execution request may be generated on the basis of the received alarm event. Accordingly, the alarm service execution request data may include metadata of an alarm set content obtainable from the media server 300.

Then, the second client device 500 transmits the content metadata to the media server 300 in response to the alarm service execution request in operation S6060. Here, the second client device 500 extracts the content metadata included in the alarm service execution request message and transmits it to the media server 300. Accordingly, the second client device transmits the content metadata selected during alarm setting to the media server 300.

Then, the media server 300 transmits a content corresponding to the content metadata in a media stream format to the second client device 500 in operation S6070. The media server 300 receives the content metadata transmitted from the second client and transmits a media stream corresponding to the content metadata to the second client device in response to a control of an AV control point in the second client. Additionally, a media stream may be transmitted to the second client through the AV control point in the control device 100.

Then, the media renderer in the second client may play audio or video in the received media stream. Through such processes, the content set at a predetermined alarm time may be played in a control target device near a user.

FIGS. 11 to 16 are views illustrating an XML schema of request and response data transmitted/received between a control device and a control target device according to an embodiment of the present invention. Hereinafter, referring to FIGS. 11 to 16, a data format for each request and response is shown as follows.

FIG. 11 is a view illustrating an XML schema of registration request data when the control device 100 registers the terminal 200, i.e., a control target device, as an alarm service using device. The registration request data may be expressed in the SOAP format as shown in FIG. 11, and may be transmitted to a designated address through a unicast method. Additionally, as a command for registration request, RegisterTelCPName( ) may be used. Additionally, an Argument corresponding to the command, as the name of a control device including a control point, may use TelCPName. According to an embodiment, TelCPName may be designated by user's setting. Accordingly, a device registration request may be performed on the basis of user input information. As shown in FIG. 11, TelCPName of the control device 100 may be designated to tv@room to request device registration. Or, in the case of the first control device 100A and the second control device 100B of FIG. 8, a living room TV and a room TV may be classified and designated to tv@room and tv@livingroom. When the name is designated in such a way, since the control device displays only the name, an intuitive interface may be provided to a user.

Moreover, FIGS. 12 to 13 are views illustrating an XML schema of registration device list request data and response data according to an embodiment of the present invention. The control device 100 may request a list of devices registered in the terminal 200. For this, request data in an XML format may be transmitted using a GetTelCPList( ) or GetTelCPNameList( ) command in the SOAP format as shown in FIG. 12. Additionally, the terminal 200 may transmit a list of currently-registered TelCPNames on the basis of data in the SOAP format of FIG. 13 in response to the GetTelCPList( ) request. Additionally, a list including identification information of control devices corresponding to each TelCPName may be transmitted together.

FIG. 14 is a view illustrating an XML schema of alarm setting request data for setting an alarm according to an embodiment of the present invention. A DestinationTelCP( ) command of FIG. 14 means an alarm setting request, and may include content metadata and alarm target device information, as Argument. The content metadata may include URI information on a content selected in a ContentURI tap, and the alarm target device information may include TelCPName, i.e., the name of the selected alarm target device.

FIG. 15 is a view illustrating an XML schema of alarm event data occurring in a control target device according to an embodiment of the present invention. Here, the alarm event data may be multicasted in the GENA format. The alarm event information in the alarm event data may include URI information and alarm target device information as content metadata.

Moreover, FIG. 16 is a view illustrating an XML schema when a control device requests registration deletion to a control target device according to an embodiment of the present invention. As shown in FIG. 16, the control device may transmit a registration deletion request message to the control target device through XML data in the SOAP format. The registration deletion request message may include a registration deletion command UnregisterTelCPName and name information TelCPName of a deletion target device.

Figure 17:
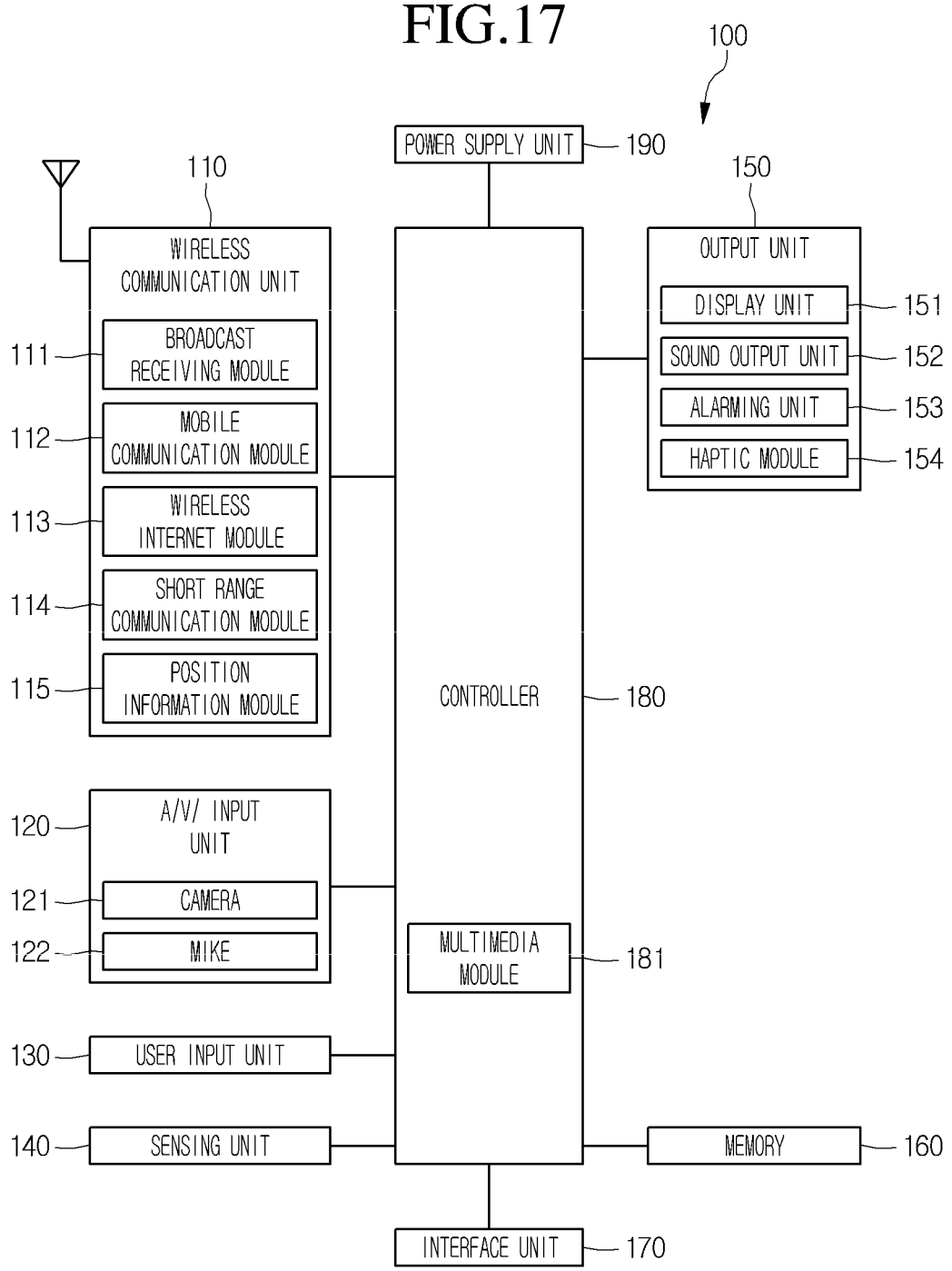
FIG. 17 is a block diagram of devices according to an embodiment of the present invention.

FIG. 17 is a block diagram of devices according to an embodiment of the present invention.

With reference to FIG. 17, the following is a description of configurations of the control device 100 and the control target device 200 according to an embodiment of the present invention.

FIG. 17 is a block diagram of devices according to an embodiment of the present invention.

For convenience of description, the control device 100 is mainly described but the block diagram of FIG. 17 may be applied to the control target device 200. Additionally, for convenience of description, the control device 100 and the control target device 200 may be expressed as a terminal.

The control device 100 or the control target device 200 may include a wireless communication unit 110, an Audio/Video (A/V) input unit 120, a user input unit 130, a sensing unit 140, an output unit 150, a memory 160, an interface unit 170, a controller 180, and a power supply unit 190. Since the components shown in FIG. 17 are not essential, the control device 100 including more or less components may be realized.

Below, the components are described one by one.

The wireless communication unit 110 includes at least one module for allowing the control device 100 to access a home network and wireless communication. For example, the wireless communication unit 110 may include at least one broadcast receiving module 111, at least one mobile communication module 112, at least one wireless internet module 113, at least one short-range communication module 114, and at least one position information module 115.

A terminal may access a home network through such a communication module.

Especially, according to an embodiment of the present invention, the wireless communication unit 110 may transmit/receive the message or device information through multicast or unicast in response to a control of the controller 180. The collected device information is stored in the memory 160.

The broadcast receiving module 111 receives a broadcast signal and/or broadcast related information from an external broadcast management server through a broadcast channel.

The broadcast channel may include a satellite channel and a terrestrial channel. The broadcast management server may mean a server generating and transmitting a broadcast signal and/or broadcast related information or a server receiving and transmitting a pre-generated broadcast signal and/or broadcast related information. The broadcast signal may include a TV broadcast signal, a radio broadcast signal, and a data broadcast signal, and also include a broadcast signal combining a TV broadcast signal or a radio broadcast signal with a data broadcast signal.

The broadcast related information may mean information relating to a broadcast channel, a broadcast program, or a broadcast service provider. The broadcast related information may be provided through a mobile communication network. In this case, the broadcast related information may be received by the mobile communication module 112.

The broadcast related information may exist in various forms. For example, the broadcast related information may exist in forms such as Electronic Program Guide (EPG) of Digital Multimedia Broadcasting (DMB) or Electronic Service Guide (ESG) of Digital Video Broadcast-Handheld (DVB-H).

The broadcast receiving module 111 may receive a digital broadcast signal by using a digital broadcast system such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T). Of course, the broadcast receiving module 111 may be configured to be proper for another broadcast system in addition to the digital broadcast system.

The broadcast signal and/or broadcast related information received through the broadcast receiving module 111 may be stored in the memory 160.

The mobile communication module 112 transmits/receives a wireless signal to/from at least one of a base station, an external terminal, and a server on a mobile communication network. The wireless signal may include various forms of data according to a voice call signal, a video call signal, or text/multimedia message transmission.

The wireless internet module 113 is a module for wireless internet access, and may be internally or externally included in the control device 100. As wireless internet technology, there are Wireless LAN (WLAN) (Wi-Fi), Wireless broadband (Wibro), World Interoperability for Microwave Access (Wimax), and High Speed Downlink Packet Access (HSDPA).

Especially, according to an embodiment of the present invention, the controller 180 accesses ISN or WFDN through the wireless internet module 113. When the number of accessible networks is less than the number of wireless internet modules 113, the controller 180 is disconnected from the network accessing through one wireless internet module 113, and accesses another network.

The short-range communication module 114 refers to a module for short-range communication. As short range communication technology, there are Bluetooth, Radio Frequency Identification (RFID), infrared Data Association (IrDA), Ultra Wideband (UWB), and ZigBee.

The position information module 115 is a module for obtaining the position of a terminal, and its representative example includes a Global Position System (GPS) module.

The A/V input unit 120 is to input an audio signal or a video signal, and may include a camera 121 and a mike 122. The camera 121 processes a video frame such as a still image or a moving image obtained by an image sensor in a video call mode or a capture mode. The processed video frame may be displayed on a display unit 151.

The video frame processed by the camera 121 may be stored in the memory 160 or may be transmitted to the outside through the wireless communication unit 110. The camera 121 may be provided two according to a usage environment.

The mike 122 receives an external sound signal through a microphone in a call mode, a recoding mode, or a voice recognition mode and processes it as voice data. In the case of a call mode, the processed voice data may be converted into a format that can be sent to a mobile communication base station and then outputted through the mobile communication module 112. The mike 122 may have various noise reduction algorithms to remove noise occurring while an external sound signal is inputted.

The user input unit 130 generates input data to allow a user to control an operation of a terminal. The user input unit 130 may include a key pad, a dome switch, a touch pad (static pressure/electrostatic), a jog wheel, and a jog switch.

The sensing unit 140 detects a current state of the control device 100 such as an open/close state of the control device 100, a position of the control device 100, user contact, an orientation of a terminal, and an acceleration/deceleration of a terminal and then generates a sensing signal to control an operation of the control device 100. For example, when the control device 100 is a slide phone, whether the slide phone is opened/closed may be sensed. Additionally, the sensing unit 140 may sense power supply of the power supply unit 190 and external device connection of the interface unit 170. Moreover, the sensing unit 140 may include a proximity sensor 141.

The output unit 150 generates a visual, auditory, and tactile related output and may include a display unit 151, a sound output module 152, an alarm unit 153, and a haptic module 154.

The display unit 151 displays (outputs) information processed in the control device 100. For example, when a terminal is in a call mode, a call related User Interface (UI) or Graphic User Interface (GUI) is displayed. When the control device 100 is in a video call mode, or a capture mode, a captured or/and received image, UI, or GUI is displayed.

The display unit 151 may include at least one of a liquid crystal display (LCD), a thin film transistor-liquid crystal display (a TFT LCD), an organic light-emitting diode (OLED), a flexible display, and a 3D display.

Among them, some displays may be a transparent or light transmissive type so that it is possible to see the outside through them. This may be called a transparent display, and its representative example includes a Transparant OLED (TOLED). The display unit 151 may have a rear structure or a light transmissive type structure. Due to such a structure, a user may see an object at the rear of the terminal body through an area that the display unit 151 of the terminal body occupies.

According to an implementation form of the control device 100, at least two display units 151 may exist. For example, the plurality of display units are separately or integrally disposed at one side or different sides, respectively, in the control device 100.

When the display unit 151 and a sensor sensing a touch operation (hereinafter, referred to as a 'touch sensor') constitute a mutual layer structure (hereinafter, referred to as a 'touch screen'), the display unit 151 may be used as an input device addition to an output device. The touch sensor may have a form such as a touch film, a touch sheet, or a touch pad.

The touch sensor is configured to covert a pressure applied to a specific portion of the display unit 151, or a change in capacitance occurring at a specific portion of the display unit 151 into an electrical input signal. The touch sensor may be configured to sense a pressure at the time of touch in addition to a touched position and area.

When there is touch input on the touch sensor, signal(s) corresponding thereto may be sent to a touch controller. The touch controller processes the signal(s) and transmits corresponding data to the controller 180. By doing so, the controller 180 recognizes which area of the display unit 151 is touched.

Referring to FIG. 17, the proximity sensor 141 may be disposed at an inner area of a terminal surrounded by the touch screen or near the touch screen. The proximity sensor 141 is a sensor sensing an object approaching a predetermined detection surface or an object present in the vicinity by using the force of an electromagnetic field or infrared, without mechanical contact. The proximity sensor 141 has a longer lifecycle and better usability than a contact type sensor.

The proximity sensor 141 may include a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor. When the touch screen is an electrostatic type, it is configured to sense the proximity of a pointer with a change in electric field according to the proximity of the pointer. In this case, the touch screen (or the touch sensor) may be classified as a proximity sensor.

Hereinafter, for convenience of description, an action for allowing the pointer on the touch screen is recognized when the pointer is close to but does not contact the touch screen is called "proximity touch", and an action for allowing the pointer to actually contact the touch screen is called "contact touch". A position for the proximity touch of the pointer on the touch screen is a position where the pointer vertically corresponds to the touch screen during the proximity touch of the pointer.

The proximity sensor senses a proximity touch and a proximity touch pattern (for example, a proximity touch distance, a proximity touch direction, a proximity touch speed, a proximity touch time, a proximity touch position, and a proximity touch moving state, and so on). Information corresponding to the sensed proximity touch operation and proximity touch pattern may be outputted on a touch screen.

The sound output module 152 may output audio data received from the wireless communication unit 110 or stored in the memory 160, in a call signal receiving mode, a call mode, a recording mode, a recording mode, a voice recognition mode, or a broadcast receiving mode. The sound output module 152 may output a sound signal relating to a function of the control device 100 (for example, call signal receiving sound, and message receiving sound). The sound output module 152 may include a receiver, a speaker, and a buzzer.

The alarm unit 153 outputs a signal for notifying event occurrence of the control device 100 or the control target device 200. Accordingly, the alarm unit 153 includes alarm service, and may transmit a signal including alarm event information on the basis of alarm setting information set in a terminal through a multicasting method.

An example of an event occurring in a terminal may include call signal reception, message reception, key signal input, and touch input. The alarm unit 153 may output content metadata for the media server 300 in a format different from a video signal or an audio signal, and for example, may output a signal for notifying event occurrence with vibration.

The video signal or audio signal may be outputted through the display unit 151 or the sound output module 152, so that they 151 and 152 may be classified as part of the alarming unit 153.

The haptic module 154 may generate various tactile effects that a user can feel. A typical example of a tactile effect that the haptic module 154 generates includes vibration. The intensity and pattern of a vibration generated by the haptic module 154 is controllable. For example, different vibrations may be synthesized and outputted or may be sequentially outputted.

The haptic module 154 may generate various tactile effects such as pin arrangement that vertically moves with respect to contact skin surface, injection power or suction power of air through a nozzle or an inlet, graze on a skin surface, contact of an electrode, effect by stimuli such as electrostatic force, and effect by cold/warm reproduction using a heat absorbing or generating device.

The haptic module 154 may deliver tactile effects through direct contact, and a user may feel tactile effect through muscle sense such as fingers or hands. The haptic module 154 may be provided two according to a configuration aspect.

The memory 160 may store a program for an operation of the controller 180, and may temporarily store input/output data (for example, a phonebook, a message, a still image, and a moving image). The memory 160 may store data relating to various patterns of vibrations and sounds, which are outputted during touch input on the touch screen.

The memory 160 may include at least one type of storage medium among a flash memory type, a hard disk type, a multimedia card micro type, card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The control device 100 may operate in relation to a web storage performing the storage function of the memory 160 on internet.

The interface unit 170 serves as a path with all external devices connected to the control device 100. The interface unit 170 receives data from an external device or power, and then delivers it to each component in the control device 100 or transmits data in the control device 100 to an external device. For example, the interface unit 170 includes a wired/wireless headset port, an external charging port, a wired/wireless data port, a memory card port, a port connecting a device equipped with an identification module, an audio input/output (I/O) port, a video input/output (I/O) port, and an earphone port.

The identification module is a chip storing various information to authenticate the permission of the control device 100, and may include a User Identify Module (UIM), a Subscriber Identity Module (SIM), and a Universal Subscriber Identity Module (USIM). A device equipped with an identification module (hereinafter, referred to as an "identification device') may be manufactured with a smart card type. Accordingly, an identification device may be connected to a terminal through a port.

When a terminal is connected to an external cradle, the interface unit may be a path through which power is supplied from the cradle to the terminal, or various command signals inputted from the cradle are delivered to the terminal. Various command signals or power inputted from the cradle may operate as a signal for recognizing that the terminal is accurately mounted on the cradle.

The controller 180 controls overall operations of a terminal in general. For example, control and processing relating to a voice call, a data call, and a video call are performed. The control unit 180 may include a multimedia module 181 for multimedia playback. The multimedia module 181 may be implemented in the controller 180 or may be separated from the controller 180.

Especially, the controller 180 may perform the determination and decision described with reference to FIGS. 1 to 16. That is, the controller 180 controls the wireless communication unit 110 and performs each operation shown in FIGS. 1 to 16.

Additionally, the controller 180 may perform pattern recognition processing to recognize writing input and drawing input on the touch screen as text and images, respectively.

The power supply unit 190 supplies power necessary for operations of each component by receiving external power and internal power in response to a control of the controller 180.

Various embodiments described herein may be realized in a computer or device similar thereto readable recording medium by using software, hardware, or a combination thereof.

In terms of hardware realization, the embodiments described herein may be realized by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, such embodiments may be realized by the controller 180.

According to software implementation, embodiments such as procedures or functions may be realized with an additional software module performing at least one function or operation. Software code may be realized by software application written in a proper program language. The software code is stored in the memory 160 and is executed by the controller 180.

According to an embodiment of the present invention, the above method may be realized by a processor readable code in a program recorded medium. Examples of a processor readable medium include read-only memory (ROM), random-access memory (RAM), CD-ROMs, magnetic tapes, floppy disks, and optical data storage devices, and carrier waves (such as data transmission through the Internet).

The configurations and methods of the described embodiments are not applied being limited to the above-described devices and some or all of the embodiments are selectively combined and configured so that various modifications of the embodiments may be provided.

The invention claimed is:

1. An operating method of a control device, the method comprising:
  receiving, by the control device, content metadata from a first target device;
  displaying, by the control device, a content list corresponding to the content metadata;
  receiving, by the control device, a first user selection input for selecting a content for an alarm event among content included in the content list, wherein the alarm event corresponds to an alarm time set by a user;
  receiving, by the control device, a device list from a second target device that provides the alarm event, wherein the device list is a list of devices registered for an alarm service;
  displaying, by the control device, the device list;
  receiving, by the control device, a second user selection input for selecting at least one alarm target device among the registered devices included in the device list;
  receiving, by the control device, a third user selection input for selecting an alarm method,
  transmitting, by the control device, alarm event information and alarm method information to the second target device for use with the alarm event,
  wherein the alarm event information includes information regarding the at least one alarm target device to provide the content associated with the alarm event and an alarm message in textual format,
  wherein the alarm method information includes information regarding the selected alarm method through the third user selection input,
  wherein when the user's location is a first location, the second target device unicasts the alarm event to a predetermined alarm target device based on the alarm method information at the set alarm time, wherein the predetermined alarm target device is not included in the device list, and
  wherein when the user's location is a second location, the second target device transmits the alarm event to the at least one alarm target device at the set alarm time, wherein the at least one alarm target device provides the content associated with the alarm event after receiving the alarm event information from the second target device.

2. The method according to claim 1, further comprising:
  receiving, by the control device, alarm time setting information from the second target device;
  updating, by the control device, the received alarm time setting information; and
  transmitting, by the control device, the updated alarm time setting information to the second target device,
  wherein the alarm time setting information comprises one of whether to activate an alarm, whether to be morning or afternoon, and an alarm time value.

3. The method according to claim 1, wherein the alarm event information is expressed in an XML.

4. An operating method of a control target device providing an alarm event, the method comprising:
  transmitting, by the control target device, a device list to a control device in response to a request of the control device,
  wherein the device list is a list of devices registered for providing an alarm service;
  receiving alarm event information and alarm method information from the control device;
  wherein the alarm event information includes information regarding at least one alarm target device to provide a content associated with an alarm event and an alarm message in textual format,
  wherein the alarm method information includes information regarding a selected alarm method through a user selection input performed at the control device,
  wherein the at least one alarm target device is selected among the registered devices included in the device list,
  generating the alarm event at a set alarm time by a user;
  unicasting, when the user's location is a first location, the alarm event to a predetermined alarm target device based on the alarm method information at the set alarm time,
  wherein the predetermined alarm target device is not included in the device list,
  transmitting, when the user's location is a second location, the generated alarm event to the at least one alarm target device;
  transmitting the alarm event information to the at least one alarm target device in response to a request of the at least one alarm target device,
  wherein the at least one alarm target device provides the content associated with the alarm event after receiving the alarm event information from the control target device;

receiving a deletion request message from the control device, and deleting the control device from the device list.

5. The method according to claim 4, further comprising:

transmitting alarm time setting information to the control device in response to a request of the control device; and receiving updated alarm time setting information from the control device, wherein the alarm time setting information comprises one of whether to activate an alarm, whether to be morning or afternoon, and an alarm time.

6. The method according to claim 4, wherein the transmitting of the alarm event comprises:

converting the generated alarm event into a text format by using a General Event Notification Architecture (GENA) and multicasting the converted alarm event.

7. A control device connected to a home network, the control device comprising:

a wireless communication unit to communicate with other devices;

a display unit to display an image;

a user input unit to detect a user input; and a controller to control the wireless communication unit, the display unit, and the user input unit, wherein the controller is configured to:

receive content metadata from a first target device, display a content list corresponding to the content metadata and receive a first user selection input for selecting a content for an alarm event among content included in the content list, wherein the alarm event corresponds to an alarm time set by a user, receive a device list from a second target device providing the alarm event, wherein the device list is a list of devices registered for an alarm service, display the device list and receive a second user selection input for selecting at least one alarm target device among the registered devices included in the device list, receive, by the control device, a third user selection input for selecting an alarm method, transmit alarm event information and alarm method information to the second target device for use with the alarm event, wherein the alarm event information includes information regarding the at least one alarm target device to provide the content associated with the alarm event and an alarm message in textual format, wherein the alarm method information includes information regarding the selected alarm method through the third user selection input, wherein when the user's location is a first location, the second target device unicasts the alarm event to a predetermined alarm target device based on the alarm method information at the set alarm time, wherein the predetermined alarm target device is not included in the device list, wherein when the user's location is a second location, the second target device transmits the alarm event to the at least one alarm target device at the set alarm time, and wherein the at least one alarm target device provides the content associated with the alarm event after receiving the alarm event information from the second target device.

8. The device according to claim 7, wherein the controller is further configured to receive alarm time setting information from the second target device and transmit updated alarm time setting information to the second target device, and wherein the alarm time setting information comprises one of whether to activate an alarm, whether to be morning or afternoon, and an alarm time value.

9. The device according to claim 7, wherein the alarm event information is expressed in an XML.

10. A control target device comprising:

a communication module to communicate with other devices;

an alarm service module to generate an alarm event at a set alarm time;

a controller to control the communication module and the alarm service module;

wherein the controller is configured to:

transmit a device list to a control device in response to a request of the control device;

wherein the device list is a list of devices registered for providing an alarm service, receive alarm event information and alarm method information from the control device, wherein the alarm event information includes information regarding at least one alarm target device to provide a content associated with the alarm event and an alarm message in textual format, wherein the alarm method information includes information regarding a selected alarm method through a user selection input performed at the control device, wherein the at least one alarm target device is selected among the registered devices included in the device list;

generate the alarm event at the set alarm time by a user;

unicast, when the user's location is a first location, the alarm event to a predetermined alarm target device based on the alarm method information at the set alarm time, wherein the predetermined alarm target device is not included in the device list;

transmit, when the user's location is a second location, the generated alarm event to the at least one alarm target device;

transmit the alarm event information to the at least one alarm target device in response to a request of the at least one alarm target device, wherein the at least one alarm target device provides the content associated with the alarm event after receiving the alarm event information from the control target device, receive a deletion request message from the control device, and delete the control device from the device list.

11. The device according to claim 10, wherein the controller is further configured to transmit alarm time setting information to the control device and receive updated alarm time setting information from the control device, and wherein the alarm time setting information comprises one of whether to activate an alarm, whether to be morning or afternoon, and an alarm time value.

12. The device according to claim 10, wherein the controller is further configured to convert the generated alarm event into a text format by using a General Event Notification Architecture (GENA) and multicast the converted alarm event.

* * * * *